United States Patent
Yamamori et al.

(10) Patent No.: US 7,819,041 B2
(45) Date of Patent: Oct. 26, 2010

(54) TRANSMISSION RATIO VARIABLE DEVICE AND STEERING GEAR

(75) Inventors: Motoyasu Yamamori, Nagoya (JP);
Hidetoshi Fujiwara, Nukata-gun (JP);
Osamu Watanabe, Okazaki (JP);
Yoshinori Suzuki, Okazaki (JP);
Hirotsune Suzuki, Toyokawa (JP)

(73) Assignee: JTEKT Corporation, Osaka-shi (JP)

( * ) Notice: Subject to any disclaimer, the term of this patent is extended or adjusted under 35 U.S.C. 154(b) by 446 days.

(21) Appl. No.: 11/912,040

(22) PCT Filed: Nov. 24, 2006

(86) PCT No.: PCT/JP2006/323421
§ 371 (c)(1),
(2), (4) Date: Oct. 19, 2007

(87) PCT Pub. No.: WO2007/061042
PCT Pub. Date: May 31, 2007

(65) Prior Publication Data
US 2009/0031852 A1    Feb. 5, 2009

(30) Foreign Application Priority Data
Nov. 24, 2005    (JP) .............................. 2005-338662

(51) Int. Cl.
*F16H 33/00* (2006.01)
(52) U.S. Cl. ......................................... 74/640; 475/150
(58) Field of Classification Search ................... 74/640; 475/149, 150; 180/412, 413
See application file for complete search history.

(56) References Cited

U.S. PATENT DOCUMENTS

| 6,718,242 B1 * | 4/2004 | Mori et al. .................... 701/41 |
| 7,306,535 B2 * | 12/2007 | Menjak et al. ................ 475/29 |
| 2005/0178607 A1 * | 8/2005 | Kodama et al. ............. 180/422 |

FOREIGN PATENT DOCUMENTS

EP    1 384 651 A2    1/2004

(Continued)

*Primary Examiner*—David D Le
(74) *Attorney, Agent, or Firm*—Oblon, Spivak, McClelland, Maier & Neustadt, L.L.P.

(57) ABSTRACT

A variable transmission ratio apparatus for effectively preventing ratcheting between a flexible spline and a circular spline caused by a steering operation performing in a locked state. A variable transmission ratio apparatus includes a strain wave gear mechanism for adding rotation resulting from motor drive to rotation from an input shaft resulting from a steering operation and transmitting the added rotation to an output shaft, a housing accommodating the strain wave gear mechanism and the motor and fixed to a non-rotating portion, and a lock device for locking the housing and a motor shaft in a manner prohibiting relative rotation therebetween. Among the circular splines forming the strain wave gear mechanism, the number of teeth of the circular spline connected to the output shaft is greater than the number of teeth of the circular spline connected to the input shaft.

7 Claims, 4 Drawing Sheets

FOREIGN PATENT DOCUMENTS

| | | |
|---|---|---|
| EP | 1 459 959 A2 | 9/2004 |
| EP | 1 588 923 A2 | 10/2005 |
| JP | 10 129510 | 5/1998 |
| JP | 2002 340140 | 11/2002 |
| JP | 2003-306155 | 10/2003 |
| JP | 2003-320945 | 11/2003 |
| JP | 2004 9982 | 1/2004 |
| JP | 2004 175336 | 6/2004 |
| JP | 2005 53446 | 3/2005 |
| JP | 2005 212616 | 8/2005 |

* cited by examiner

TRANSMISSION RATIO VARIABLE DEVICE AND STEERING GEAR

FIELD OF THE INVENTION

The present invention relates to a variable transmission ratio apparatus and a steering apparatus using a strain wave gear mechanism.

BACKGROUND OF THE INVENTION

In the prior art, a variable transmission ratio apparatus using a strain wave gear mechanism as a differential gear mechanism adds rotation resulting from motor drive to rotation from an input shaft resulting from a steering operation and transmits the resulting rotation from the input shaft to an output shaft. Such a variable transmission ratio apparatus may be of a housing-integrated type in which a housing rotates integrally with an input shaft (refer, for example, to patent document 1 below), or may be of a housing-fixed type in which a housing is fixed to a non-rotating portion of a vehicle (refer, for example, to patent document 2 below).

The strain wave gear mechanism may include, for example, a pair of circular splines, with one of the circular splines having a greater number of teeth than the flexible spline. The difference in the number of teeth causes a rotation difference during rotation of the mated portion. This yields a reduction ratio.

Normally, to make the apparatus fail-safe or when turning off an ignition switch of a vehicle, a variable transmission ratio apparatus using a strain wave gear mechanism includes a lock device for locking a motor shaft connected to a wave generator and a housing to prevent relative rotation. Activation of the lock device restricts free rotation of the motor shaft and maintains a state in which the transmission of torque between the input shaft and the output shaft is enabled.

Patent Document 1: Japanese Laid-Open Patent Publication No. 2004-9982
Patent Document 2: Japanese Laid-Open Patent Publication No. 2004-175336

SUMMARY OF THE INVENTION

The housing-integrated variable transmission ratio apparatus has its housing and input shaft structured to rotate integrally. Thus, when the lock device of the housing-integrated variable transmission ratio apparatus is operating, the wave generator connected to the motor shaft is stopped. This also stops the operation of the strain wave gear mechanism. In this case, the pair of circular splines, the flexible spline, and the wave generator all rotate integrally. In other words, the motor shaft and the input and output shafts all rotate integrally.

In the housing-fixed variable transmission ratio apparatus, the housing and the motor shaft are locked to prevent free rotation of the motor shaft when a steering torque or a reaction torque is input. However, this does not stop operation of the strain wave gear mechanism. The lock device of the housing-fixed variable transmission ratio apparatus operates to stop free rotation of the wave generator connected to the motor shaft but permits the input and output shafts to rotate when a steering operation is performed. In this case, the portion of the flexible spline pressed by the wave generator rotates inside the flexible spline in a direction opposite to a direction in which the flexible spline rotates. This rotates the mated portions of the flexible spline and the circular splines.

When the mated portions of the flexible spline and the circular splines rotate, the engagement and disengagement of each external tooth of the flexible spline and two internal teeth of the circular splines causes sliding between the side surfaces of the external tooth and the internal teeth. When a large torque is applied to the mated portions of the flexible spline and the circular splines, the tooth of the flexible spline and the teeth of the circular splines may not be properly mated with each other, that is a certain tooth goes over the corresponding tooth to be mated with. This phenomenon is referred to as "ratcheting." In the locked state, the rotating mated portions of the flexible spline and the circular splines may cause problems unique to the housing-fixed variable transmission ratio apparatus.

To solve the above problem, it is an object of the present invention to provide a variable transmission ratio apparatus that effectively prevents the ratcheting phenomenon from occurring between a flexible spline and a circular spline when a steering operation is performed in a locked state.

To solve the above problem, a first aspect of the present invention provides a variable transmission ratio apparatus including a differential gear mechanism that adds rotation resulting from motor drive to rotation from an input shaft resulting from a steering operation and transmits the added rotation to an output shaft. A housing accommodates the differential gear mechanism and a motor, which is a drive source, and is fixed to a non-rotating portion. A lock device locks the housing and a rotation shaft of the motor in a manner prohibiting relative rotation therebetween. The differential gear mechanism is formed by a strain wave gear mechanism including a pair of circular splines arranged next to each other in a concentric manner. A tubular flexible spline is arranged at an inner side of the circular splines in a manner concentric with the circular splines so as to be partially mated with each of the circular splines. A wave generator rotates a mated portion of the flexible spline when driven by the motor. One of the circular splines that is connected to the output shaft has a greater number of teeth than the other one of the circular splines that is connected to the input shaft.

When a steering operation is performed in a locked state, the circular spline connected to the output shaft rotates in a direction opposite the direction in which the wave generator rotates. However, reaction torque countering the steering torque, that is, torque acting in the same direction as the rotation direction of the wave generator, is input into the circular spline. Thus, each external tooth of the flexible spline is displaced in a direction in which it moves away from the space between adjacent internal teeth of the circular spline, or in a radially inward direction, while its side surface slides along side surfaces of the internal teeth of the circular spline. As a result, friction produced when the external teeth of the flexible spline moves away from the internal teeth of the circular spline pulls the flexible spline in the radially inward direction. This effectively prevents ratcheting from occurring between the flexible spline and the circular spline when a steering operation is performed in a locked state.

In the first aspect, it is preferred that the circular spline connected to the output shaft has a thickness that is greater than a thickness of the circular spline connected to the input shaft.

When the circular spline connected to the output shaft has a large number of teeth, the apparatus may have the problem of ratcheting when a large inverse input load is applied, such as when a steered wheel crashes against a curb. Although such an inverse input load becomes instantaneously extremely high, the inverse input load is continuously applied for a very short period of time. Such a problem can be solved by increasing the rigidity of the circular spline. When the above structure increases the rigidity of the circular spline connected to the output shaft and effectively prevents ratcheting when an inverse input load is applied.

A second aspect of the present invention provides a variable transmission ratio apparatus including a differential gear mechanism that adds rotation resulting from motor drive to rotation from an input shaft resulting from a steering operation and transmits the added rotation to an output shaft. A housing accommodates the differential gear mechanism and a motor, which is a drive source, and is fixed to a non-rotating portion. A lock device locks the housing and a rotation shaft of the motor in a manner prohibiting relative rotation therebetween. The differential gear mechanism is formed by a strain wave gear mechanism including a circular spline. A tubular flexible spline is arranged at an inner side of the circular spline in a manner concentric with the circular spline so as to be partially mated with the circular spline. A wave generator rotates a mated portion of the flexible spline when driven by the motor. The circular spline has a greater number of teeth than the flexible spline and is connected to the output shaft.

A third aspect of the present invention provides a steering apparatus including an input shaft connected to a steering wheel, a pinion shaft mated with a rack shaft, a variable transmission ratio mechanism, and a housing supporting the input shaft and accommodating the pinion shaft and the variable transmission ratio mechanism. The variable transmission ratio mechanism includes a motor having a stator and a motor shaft, a harmonic gear reduction device having a first circular spline, a second circular spline, and a flexible spline, and an output shaft. The input shaft is connected to the first circular spline. The output shaft is connected to the second circular spline. The motor shaft is connected to the flexible spline. The output shaft and the pinion shaft is connected to each other by a torsion bar. The second circular spline has a greater number of teeth than the first circular spline.

DETAILED DESCRIPTION OF THE PREFERRED EMBODIMENTS

First Embodiment

A variable transmission ratio apparatus of a housing-fixed type according to a first embodiment of the present invention will now be described with reference to the drawings.

Figure 1:
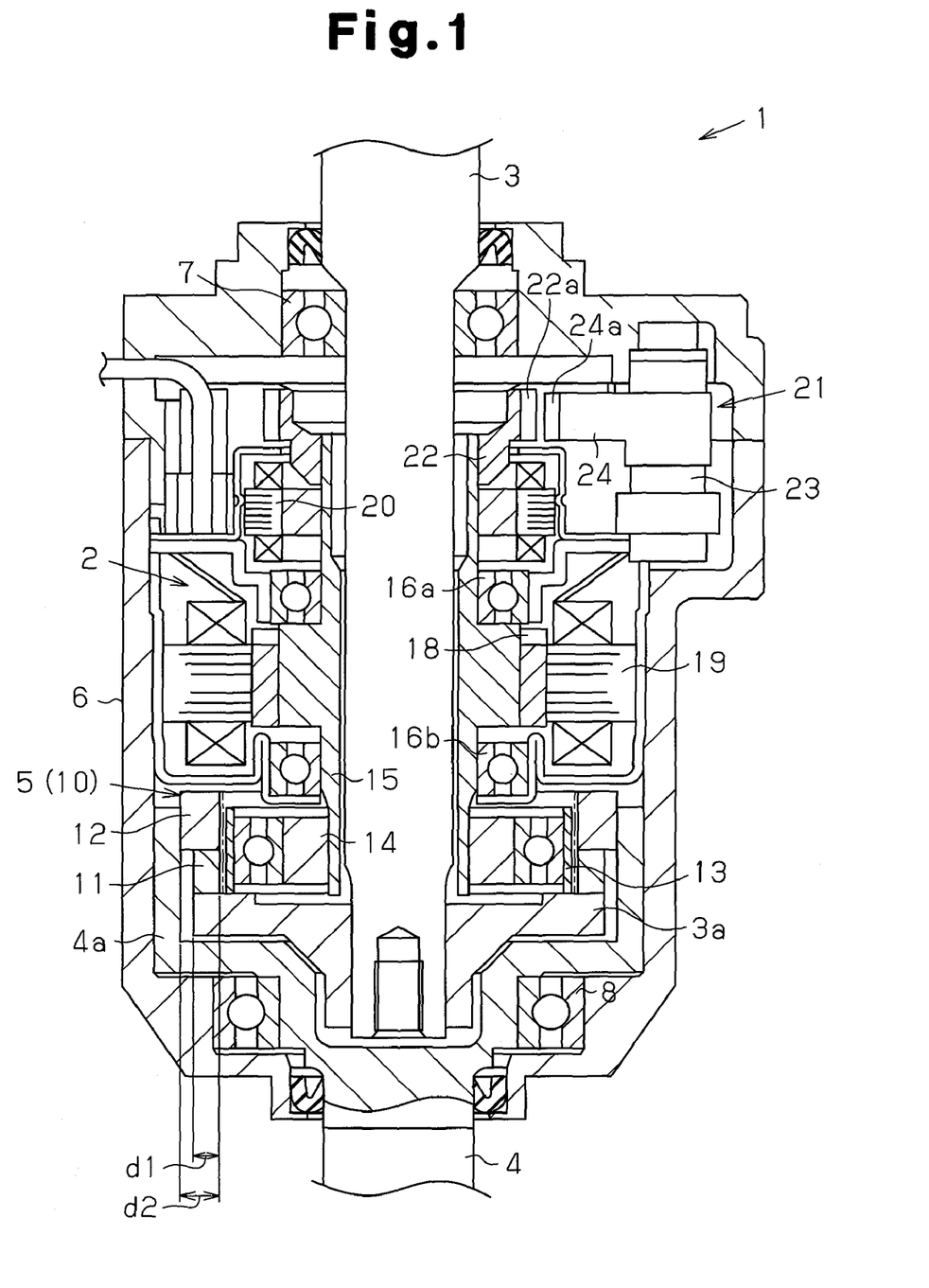
FIG. 1 is a schematic cross-sectional view showing the structure of a variable transmission ratio apparatus according to a first embodiment.

As shown in FIG. 1, a variable transmission ratio apparatus 1 includes a motor 2, a differential gear mechanism 5, and a housing 6. The motor 2 serves as a power source. The differential gear mechanism 5 adds rotation resulting from motor drive to rotation from an input shaft 3 resulting from a steering operation and transmits the resulting rotation from the input shaft 3 to an output shaft 4. The housing 6 accommodates the motor 2 and the differential gear mechanism 5.

In detail, the housing 6 of the present embodiment is cylindrical. The input shaft 3 and the output shaft 4 have end portions that are arranged in the housing 6 and supported in a rotatable manner relative to the housing 6 by bearings 7 and 8 arranged in the vicinity of two open ends of the housing 6. More specifically, the input shaft 3 is supported by the bearing 7 arranged at a steering wheel side of the housing 6, that is, in the vicinity of an upper open end of the housing 6 as viewed in FIG. 1. The output shaft 4, or a connecting member 4a arranged on an end portion of the output shaft 4, is supported by the bearing 8 arranged at the side of the housing 6 opposite the steering wheel, that is, in the vicinity of a lower open end of the housing 6 as viewed in FIG. 1. The end portions of the input shaft 3 and the output shaft 4 arranged in the housing 6 are connected to the differential gear mechanism 5 accommodated in the housing 6.

The variable transmission ratio apparatus 1 of the present embodiment is mounted on a steering column. The input shaft 3 forms an input side of a column shaft to which a steering wheel (not shown) is connected. The output shaft 4 forms an output side of the column shaft. The housing 6 is fixed to a non-rotating portion of a vehicle, or more specifically, to a body (not shown) of the vehicle.

In the present embodiment, a strain wave gear mechanism 10 is used as the differential gear mechanism 5. The strain wave gear mechanism 10 includes a pair of circular splines 11 and 12, a tubular flexible spline 13, and a wave generator 14. The circular splines 11 and 12 are concentric with each other. The flexible spline 13 is concentric with the splines 11 and 12 so as to mate the splines 11 and 12. The wave generator 14 is arranged inside the flexible spline 13.

The circular splines 11 and 12 have different numbers of teeth. In an elliptically deformed state, the flexible spline 13 is arranged inside the circular splines 11 and 12. The flexible spline 13 has external teeth partially engaged with the internal teeth of the circular splines 11 and 12. When driven by the motor 2, the wave generator 14 rotates the deformed elliptical flexible spline 13, or portions of the flexible spline 13 mated with the circular splines 11 and 12.

A brushless motor having a hollow motor shaft 15 is used as the motor 2, which serves as a drive source. The motor 2 is concentric with the input shaft 3 at the steering wheel side of the strain wave gear mechanism 10. The motor shaft 15, which is supported by bearings 16a and 16b, is accommodated in the housing 6 in a rotatable manner. A stator 19 fixed to the housing 6 is arranged outside a rotor 18 fixed to the motor shaft 15. A resolver 20 for detecting a rotation angle of the motor shaft 15 is arranged in the vicinity of the end portion of the motor shaft 15 at the steering wheel side. The end portion of the motor shaft 15 opposite to the steering wheel side is connected to the wave generator 14 forming the strain wave gear mechanism 10.

The input shaft 3 is inserted through the motor shaft 15 and connected to the one of the circular splines 11 and 12 arranged at the side of the output shaft 4, that is, the first circular spline 11, by an inner connecting member 3a. The second circular spline 12 arranged at the side of the input shaft 3 is fixed to the output shaft 4 by the outer connecting member 4a, which is arranged radially outward from the inner connecting member 3a.

Rotation of the input shaft 3 resulting from a steering operation is transmitted from the first circular spline 11, which is connected to the input shaft 3, to the second circular spline 12 by the flexible spline 13. The second circular spline 12 transmits the rotation to the output shaft 4. The wave generator 14 arranged inside the flexible spline 13 is driven by the motor 2 to rotate the portions of the deformed elliptical flexible spline 13 mated with the circular splines 11 and 12. As a result, the rotation resulting from the motor drive is added to the rotation resulting from the steering operation. This changes the rotation transmission ratio between the input shaft 3 and the output shaft 4.

The variable transmission ratio apparatus 1 of the present embodiment further includes a lock device 21 for locking the motor shaft 15, which is a rotation shaft of the motor 2, and the housing 6 to prevent relatively rotation therebetween. In detail, an annular lock holder 22 is fixed to the end portion of the motor shaft 15 at the steering wheel side. The lock holder 22 rotates integrally with the motor shaft 15. A plurality of engagement grooves 22a extend axially along the circumferential surface of the lock holder 22. Further, a pivot shaft 23, which extends parallel to the axis of the motor shaft 15, is fixed to the housing 6 at the outer side of the lock holder 22. A lock arm 24 is pivotally supported by the pivot shaft 23. The lock arm 24 has a distal end defining an engagement hook 24a, which is engageable with the engagement grooves 22a of the lock holder 22. The lock device 21 is formed by the lock holder 22, the lock arm 24, and a torsion coil spring and solenoid (not shown) for pivoting the lock arm 24.

In the present embodiment, the elastic force of the torsion coil spring biases the lock arm 24 to pivot the engagement hook 24a toward the lock holder 22. In an unlocked state, driving force of the solenoid holds the engagement hook 24a at a radially outward side of the lock holder 22. In a locked state, the solenoid is de-energized and the engagement hook 24a of the lock arm 24 engages the engagement grooves 22a of the lock holder 22 so as to lock the motor shaft 15 and the housing 6 and prevent relative rotation therebetween. This restricts free rotation of the motor shaft 15 when steering torque or a reaction torque is input and enables the transmission of torque between the input shaft 3 and the output shaft 4.

In the housing-fixed variable transmission ratio apparatus 1 of the present embodiment, the input shaft 3 is permitted to rotate relative to the motor shaft 15 even when the housing 6 and the motor shaft 15 are locked as described above.

More specifically, in the locked state of the housing 6 and the motor shaft 15, the wave generator 14 at the inner side of the flexible spline 13 appears to rotate in a direction opposite to a direction in which the flexible spline 13 and the first and second circular splines 11 and 12 rotate. When a large torque is input in such a state, especially when a large torque is input continuously for a relatively long period of time such as when steered wheels are turned while the ignition switch is off, ratcheting may easily occur in the portion of the flexible spline 13 mated with the one of the first and second circular splines 11 and 12 having a larger number of teeth.

Factors causing ratcheting in the large torque input state will now be described. These findings have been obtained through experiments by the applicant of the present application.

Figure 2A:
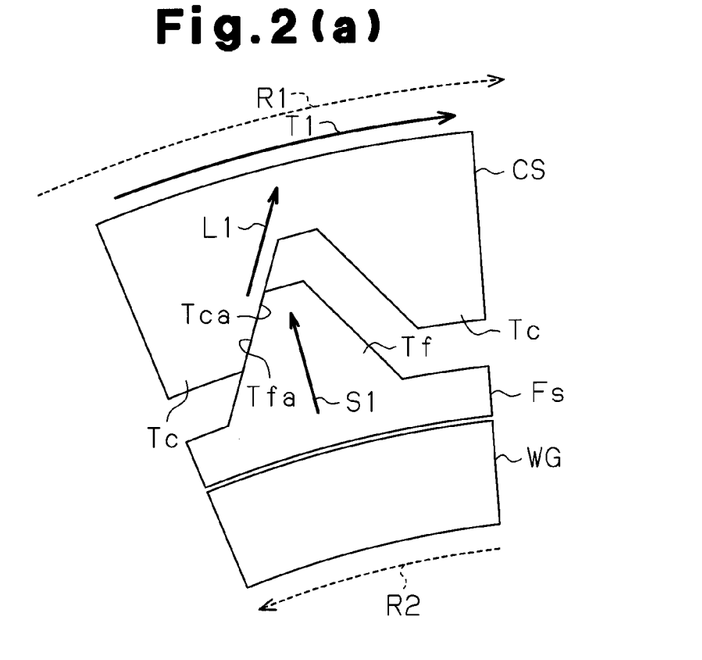
FIGS. 2(a) and 2(b) describe the mechanism of ratcheting.

In a strain wave gear mechanism in which free rotation of a wave generator WG is restricted, torque is assumed to be input at the side of a circular spline CS having a larger number of teeth. The state of an internal tooth Tc of the circular spline CS having more teeth will be described first. As shown in FIG. 2(a), when the circular spline CS having a greater number of teeth and the wave generator WG appear to rotate in opposite directions and a torque input direction T1 in which a torque is input to the circular spline CS is opposite to a rotation direction R2 in which the wave generator WG appears to rotate, an external tooth Tf of a flexible spline FS is displaced in a direction in which the external tooth Tf enters the space between two adjacent internal teeth Tc of the circular spline CS, or in a radially outward direction indicated by the arrow S1, as a side surface Tfa of the external tooth Tf slides along a side surface Tca of the internal tooth Tc of the circular spline CS. As a result, when the external tooth Tf of the flexible spline FS enters the space between the internal teeth Tc, friction widens the circular spline CS in a radially outward direction L1. This causes the above-described ratcheting.

Figure 2B:
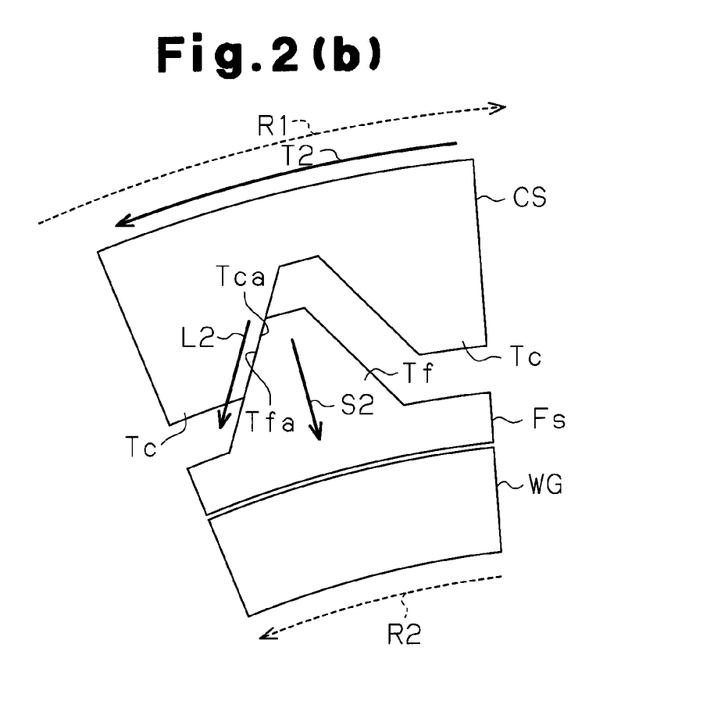

Next, on the strain wave gear mechanism in which free rotation of the wave generator WG is restricted, the state of an internal tooth Tc of the circular spline CS having a larger number of teeth will be described in a case in which torque is input from the circular spline having a smaller number of teeth. As shown in FIG. 2(b), when a torque input direction T2 of the circular spline CS is the same as the rotation direction R2 in which the wave generator WG appears to rotate, that is, when the circular spline CS rotates to follow rotation of the flexible spline FS, and a reaction torque is thereby applied to the circular spline CS, the external tooth Tf of the flexible spline FS is displaced in a direction in which the external tooth Tf moves away from the two adjacent internal teeth Tc of the circular spline CS, or in a radially inward direction indicated by the arrow S2, as a side surface Tfa of the external tooth Tf of the flexible spline FS slides along a side surface Tca of the internal tooth Tc of the circular spline CS. As a result, the circular spline CS is pulled to be deformed in a radially inward direction L2 by friction produced when the external tooth Tf of the flexible spline FS moves away from the space between the internal teeth Tc. In this case, the ratcheting described above is less likely to occur.

Based on these findings, the variable transmission ratio apparatus 1 of the present embodiment includes the second circular spline 12 connected to the output shaft 4 having a greater number of teeth than the first circular spline 11 connected to the input shaft 3 (and the flexible spline 13). In detail, each of the first circular spline 11 and the flexible spline 13 has one hundred teeth, whereas the second circular spline 12 connected to the output shaft 4 has one hundred and two teeth.

More specifically, when a steering torque is input in the locked state of the housing 6 and the motor shaft 15, the second circular spline 12 rotates integrally with the input shaft 3. As a result, the wave generator 14 appears to rotate in the direction opposite to the rotation direction, that is, in the direction opposite to the direction in which the torque is input to the second circular spline 12. The second circular spline 12 connected to the output shaft 4 and the wave generator 14 rotate in the opposite directions. However, the input torque is a reaction torque that counters the steering torque. In other words, torque acting in the same direction as the rotation direction of the wave generator 14 is input into the second circular spline 12. In the present embodiment, the second circular spline 12 connected to the output shaft 4 has a large number of teeth to prevent ratcheting from occurring when a steering operation is performed in a locked state, such as when the steered wheels are turned in a locked state after the ignition switch is turned off.

When the second circular spline 12 connected to the output shaft 4 has a large number of teeth, the problem of ratcheting may occur when a large inverse input load is applied, such as when a steered wheel crashes against a curb. However, although such an inverse input load instantaneously applies an extremely large stress to the mated portions of the second circular spline 12 and the flexible spline 13, the stress is applied for a very short period of time. Thus, such a problem may be solved by increasing the rigidity of the second circular spline 12. Accordingly, in the present embodiment, as shown in FIG. 1, the second circular spline 12 connected to the output shaft 4 has a thickness d1 that is greater than a thickness d2 of the first circular spline 11 connected to the input shaft 3. This increases the rigidity.

To improve the mating ratio of the mated portions of the splines, each spline has a tooth form determined by referring to the descriptions of Japanese Laid-Open Patent Publication No. 5-115943 and Japanese Laid-Open Patent Publication No. 5-172195.

In the first embodiment, the apparatus includes the flat-type strain wave gear mechanism 10 in which the circular splines 11 and 12 are arranged concentric with each other. The apparatus may alternatively use a cup-type strain wave gear mechanism having a single circular spline and a cup-type flexible spline. In this case, it is only required that the circular spline is connected to an output shaft.

Second Embodiment

A second embodiment of the present invention will now be described in detail with reference to the drawings.

Figure 3:
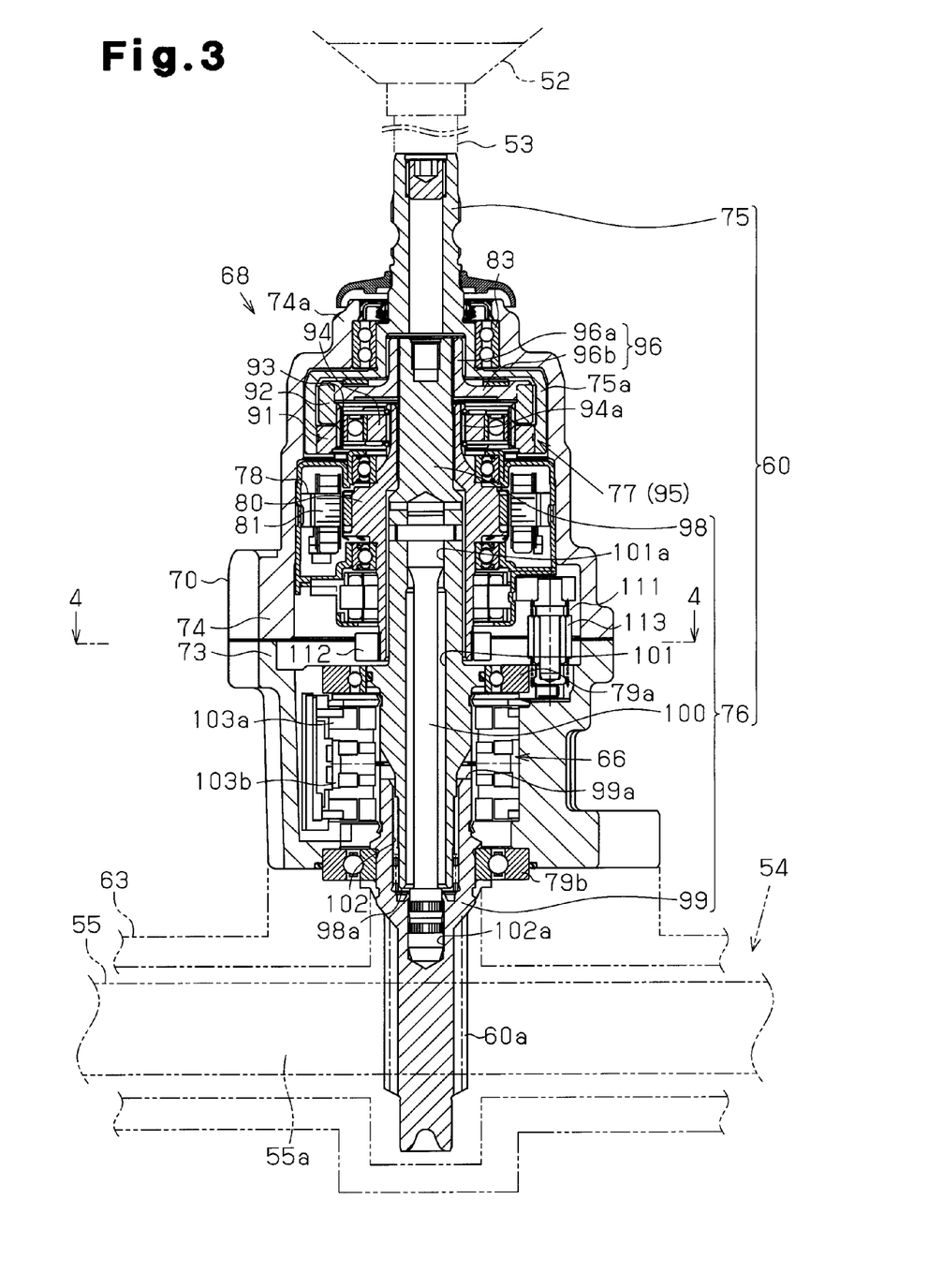
FIG. 3 is a cross-sectional view showing a variable transmission ratio apparatus according to a second embodiment of the present invention.

As shown in FIG. 3, a vehicle steering apparatus of the present embodiment includes a transmission shaft 60 forming part of a steering shaft 53 to which a steering wheel 52 is fixed. The transmission shaft 60 is connected to a rack shaft 55 by a rack and pinion mechanism 54. Rotation of the steering shaft 53 resulting from a steering operation is converted to a reciprocal linear movement of the rack shaft 55 by the rack and pinion mechanism 54.

Pinion teeth 60a formed on a lower end of the transmission shaft 60 are mated with rack teeth 55a formed on the rack shaft 55. The reciprocal linear movement of the rack shaft 55 caused by rotation of the steering shaft 53 is transmitted to knuckles (not shown) by tie-rods connected to the two ends of the rack shaft 55. This changes the steering angle of steered wheels of a vehicle, that is, the driving direction of the vehicle.

A rack housing 63 accommodates the rack shaft 55. A torque sensor 66 for detecting steering torque used for power assist control of a steering system is arranged on the transmission shaft 60. A variable transmission ratio apparatus 68 for varying the transmission ratio (gear ratio) between the steering wheel 52 and the steered wheels is further arranged on the transmission shaft 60.

In the present embodiment, a cylindrical pinion housing 70 is fixed to an upper surface of the rack housing 63. The transmission shaft 60 is inserted through the pinion housing 70. As a result, the transmission shaft 60 is supported in a freely rotatable manner in a state in which the pinion teeth 60a formed on its lower end are mated with the rack teeth 55a of the rack shaft 55.

The pinion housing 70 includes a first housing 73 fixed to an upper portion of the rack housing 63 and a second housing 74 connected to an upper end of the first housing 73. The pinion housing 70 accommodates the torque sensor 66 and the variable transmission ratio apparatus 68.

The transmission shaft 60 of the present embodiment is formed by an input shaft 75 to which rotation resulting from a steering operation is input and a driven shaft 76 on which the pinion teeth 60a are formed. The variable transmission ratio apparatus 68 is formed by a differential gear mechanism 77 arranged between the input shaft 75 and the driven shaft 76 and a motor 78 for driving the differential gear mechanism 77.

The driven shaft 76 is supported by bearings 79a and 79b arranged on the first housing 73 in a freely rotatable manner. The driven shaft 76 has an upper end extending into the second housing 74. A brushless motor having a hollow motor shaft 80 is used as the motor 78, which serves as a drive source. A stator 81 of the motor 78 is fixed to an inner circumference of the second housing 74. As a result, rotation of the stator 81 relative to the second housing 74 (pinion housing 70), which is a non-rotating portion, is prohibited. The upper end of the driven shaft 76 extending into the second housing 74 is inserted through the motor shaft 80 and extends to the vicinity of an upper end portion 74a of the second housing 74.

The input shaft 75 is supported by a bearing 83 arranged on the upper end portion 74a of the second housing 74 in a freely rotatable manner. The differential gear mechanism 77 forming the variable transmission ratio apparatus 68 together with the motor 78 is arranged next to the motor 78 and along the axis of the motor 78. The differential gear mechanism 77 is arranged in the vicinity of the upper end portion 74a of the second housing 74.

A strain wave gear mechanism 95 is used as the differential gear mechanism 77. The strain wave gear mechanism 95 includes a pair of first and second circular splines 91 and 92 arranged next to each other in a concentric manner, a tubular flexible spline 93 concentric with the circular splines 91 and 92 so as to be partially mated with the circular splines 91 and 92, and a wave generator 94 for rotating portions of the flexible spline 93 mated with the circular splines 91 and 92 when driven by the motor 78.

The circular splines 91 and 92 have different numbers of teeth. The flexible spline 93 is elliptically deformed and arranged at the inner side the circular splines 91 and 92. The flexible spline 93 has external teeth partially mated with internal teeth of each of the circular splines 91 and 92. The wave generator 94 is arranged at the inner side the flexible spline 93 and has a connecting portion 94a formed in its central portion spline-fitted to the motor shaft 80. When driven by the motor 78, the wave generator 94 elliptically deforms the flexible spline 93 and rotates the portions of the flexible spline 93 mated with the circular splines 91 and 92.

In the present embodiment, the input shaft 75 is connected to the first circular spline 91 arranged in the vicinity of the motor 78. The driven shaft 76 has an upper end, which is inserted through the motor shaft 80 and extended upward from the circular splines 91 and 92. The upper end of the driven shaft 76 is connected to the second circular spline 92 arranged in the vicinity of the upper end portion 74a of the second housing 74.

A connecting member 96 is arranged between the driven shaft 76 and the second circular spline 92. The connecting member 96 includes a tubular portion 96a and a flange portion 96b. The tubular portion 96a is fitted to an outer circumference of the driven shaft 76. The flange portion 96b extends from the outer circumference of the tubular portion 96a in a radially outward direction and is fitted to an inner circumference of the second circular spline 92. The connecting member 96 connects the driven shaft 76 to the second circular spline 92.

The input shaft 75 has a lower end defining a tubular large-diameter portion 75a. The large-diameter portion 75a has an inner diameter that is greater than the outer diameter of each of the circular splines 91 and 92. An inner circumference of the input shaft 75 is fitted to an outer circumference of the first circular spline 91 in a state in which the strain wave gear mechanism 95 and the connecting member 96 are accommodated in the large-diameter portion 75a. This enables the input shaft 75 to be connected to the first circular spline 91.

In the present embodiment, the strain wave gear mechanism 95 connected to the input shaft 75, the driven shaft 76, and the motor shaft 80 as described above is driven by the motor 78. This changes the transmission ratio (gear ratio) between the steering wheel 52 and the steered wheels.

Rotation of the input shaft 75 resulting from a steering operation is transmitted from the first circular spline 91, which is connected to the input shaft 75, to the second circular spline 92 by the flexible spline 93. The second circular spline 92 transmits the rotation to the driven shaft 76. The wave generator 94 is driven by the motor 78 to rotate the portions of the deformed flexible spline 93 mated with the circular splines 91 and 92. As a result, the rotation difference between the circular splines 91 and 92 caused by the different numbers of teeth between the circular splines 91 and 92 is added as rotation resulting from motor drive to the rotation resulting from a steering operation. The resulting rotation is transmitted to the driven shaft 76. This changes the rotation transmission ratio between the input shaft 75 and the driven shaft 76 or the transmission ratio (gear ratio) between the steering wheel 52 and the steered wheels.

In the present embodiment, the driven shaft 76 is formed by an intermediate shaft 98, which has an upper end connected to the strain wave gear mechanism 95, and a pinion shaft 99, which has the pinion teeth 60a formed on its lower end. A torsion bar 100 connects the intermediate shaft 98 and the pinion shaft 99. The torque sensor 66 measures a torsion angle of the torsion bar 100 to detect the steering torque input into the steering system. The intermediate shaft 98 functions as an output shaft of the strain wave gear mechanism 95.

In detail, in the present embodiment, the intermediate shaft 98 has a hollow portion 101 extending axially upward from a lower axial end 98a. The torsion bar 100 is accommodated in the hollow portion 101. The pinion shaft 99 also has a hollow portion 102 extending axially downward from an upper axial end 99a. The portion of the intermediate shaft 98 in the vicinity of the axial end 98a is loosely fitted into the hollow portion 102. The intermediate shaft 98 is independently supported by the bearing 79a, and the pinion shaft 99 is independently supported by the bearing 79b. As a result, the intermediate shaft 98 and the pinion shaft 99 are rotatable relative to each other. The torsion bar 100 has an upper end, which is fixed to a bottom part 101a of the hollow portion 101, and a lower end extending downward from the hollow portion 101, and fixed to a bottom part 102a of the hollow portion 102 in the pinion shaft 99.

The first housing 73 accommodates a pair of resolvers 103a and 103b arranged next to each other in a manner concentric with the driven shaft 76. The first resolver 103a is arranged to surround the outer circumference of the intermediate shaft 98, and the second resolver 103b is arranged to surround the outer circumference of the pinion shaft 99. The torque sensor 66 measures a torsion angle of the torsion bar 100 based on the difference in rotation angle between the intermediate shaft 98 and the pinion shaft 99 based on output signals of detections provided from the resolvers 103a and 103b. Based on the measured torsion angle, the torque sensor 66 detects the steering torque.

The variable transmission ratio apparatus of the present embodiment further includes a lock device 111 for locking the housing 70 and the motor shaft 80 of the motor 78 in a manner prohibiting relative rotation therebetween. In detail, an annular lock holder 112 is fixed to a lower end portion of the motor shaft 80. The lock holder 112 rotates integrally with the motor shaft 80. A plurality of engagement grooves 112a extend axially along the circumferential surface of the lock holder 112. Further, a pivot shaft 113, which extends parallel to the axis of the motor shaft 80, is fixed to the housing 70 at the outer side of the lock holder 112. A lock arm 114 (refer to FIG. 4) is pivotally supported by the pivot shaft 113. The lock arm 114 has a distal end defining an engagement hook 114a, which is engageable with the engagement grooves 112a of the lock holder 112. The lock device 111 is formed by the lock holder 112, the lock arm 114, and a torsion coil spring 115 and solenoid 116 for pivoting the lock arm 114.

Figure 4:
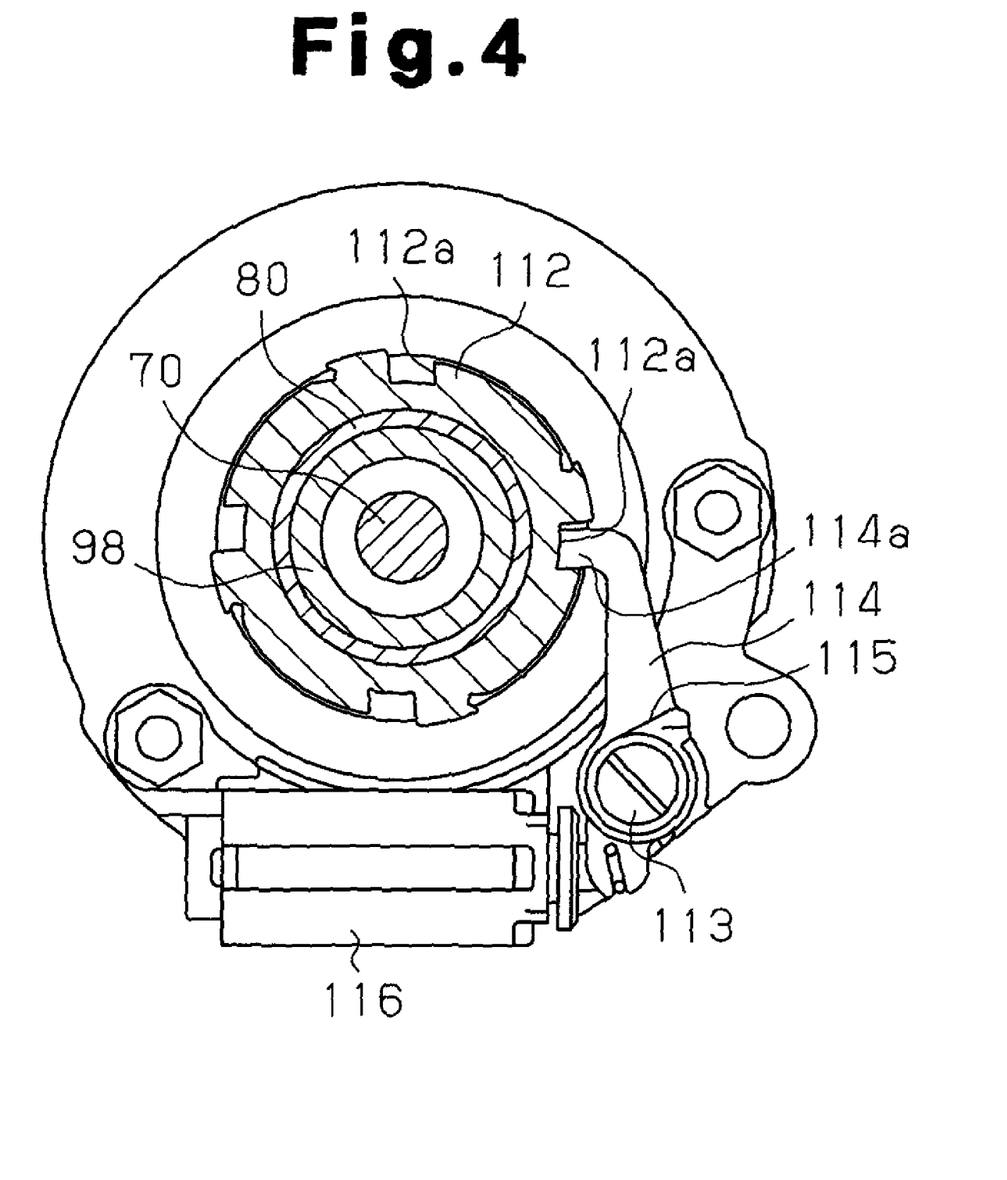
FIG. 4 is a cross-sectional view taken along line 4-4 of FIG. 3.

In the present embodiment, the elastic force of the torsion coil spring 115 biases the lock arm 114 and pivots the engagement hook 114a toward the lock holder 112. In an unlocked state, a driving force generated when the solenoid 116 is energized disengages the engagement hook 114a from the engagement grooves 112a and holds the engagement hook 114a at a radially outward side of the lock holder 112. In a locked state, the solenoid 116 is de-energized and the elastic force of the torsion coil spring 115 engages the engagement hook 114a of the lock arm 114 with the engagement grooves 112a of the lock holder 112 to lock the motor shaft 80 and the housing 70 in a manner prohibiting relative rotation therebetween. This restricts free rotation of the motor shaft 80 when a steering torque or a reaction torque is input and enables the transmission of torque between the input shaft 75 and the driven shaft 76.

In the above-described structure of the second embodiment, the second circular spline 92 connected to the driven shaft 76 has a greater number of teeth than that of the first circular spline 91 connected to the input shaft 75 in the same manner as in the first embodiment. This structure prevents ratcheting when a steering operation is performed in a locked state, such as when the steered wheels are turned in a locked state after the ignition switch is turned off.

The second embodiment has the advantages described below. The torque sensor 66 is mounted on the driven shaft 76 and the housing 70 in the vicinity of the lower end of the driven shaft 76. This prevents the variable transmission ratio control and the electrical power steering control from interfering with each other and improves the feel of the driver during steering.

The lock device 111 is arranged on the lower end of the motor shaft 80. This facilitates assembly. More specifically, this structure enables the lock device 111 to be installed through a lower opening of the second housing 24 before connecting the first and second housings 73 and 74.

The strain wave gear mechanism 95 is arranged between the motor 78 and the input shaft 75. This eliminates the need for arranging a large number of components in a concentric manner and reduces the outer diameter of the entire apparatus.

The invention claimed is:

1. A variable transmission ratio apparatus comprising:
a differential gear mechanism that adds rotation resulting from a motor drive to rotation from an input shaft resulting from a steering operation and transmits the added rotation to an output shaft;
a housing accommodating the differential gear mechanism and a motor comprising the motor drive, and fixed to a non-rotating portion; and
a lock device that locks the housing and a rotation shaft of the motor to prohibit relative rotation therebetween;
wherein the differential gear mechanism is formed by a strain wave gear mechanism including:
a pair of circular splines arranged next to each other, the circular splines being concentric with each other, wherein one of the circular splines is connected to the output shaft and the other one of the circular splines is connected to the input shaft;
a tubular flexible spline arranged at an inner side of the circular splines and a concentric with the circular splines so as to be partially mated with each of the circular splines; and a wave generator that rotates a mated portion of the flexible spline when driven by the motor;

wherein the one of the circular splines that is connected to the output shaft has a greater number of teeth than the other one of the circular splines that is connected to the input shaft.

2. The variable transmission ratio apparatus according to claim 1, wherein the circular spline connected to the output shaft has a thickness that is greater than a thickness of the circular spline connected to the input shaft.

3. A steering apparatus comprising:

an input shaft connected to a steering wheel;

a pinion shaft mated with a rack shaft;

a variable transmission ratio mechanism; and a fixed housing supporting the input shaft and accommodating the pinion shaft and the variable transmission ratio mechanism;

wherein the variable transmission ratio mechanism includes:

a motor having a stator and a motor shaft;

a harmonic gear reduction device having a first circular spline, a second circular spline, and a flexible spline; and an output shaft;

with the input shaft being connected to the first circular spline, the output shaft being connected to the second circular spline, the motor shaft being connected to the flexible spline, and the output shaft and the pinion shaft being connected to each other by a torsion bar; and the second circular spline having a greater number of teeth than the first circular spline.

4. The steering apparatus according to claim 3, further comprising:

a torque sensor, wherein the torque sensor is attached to the output shaft, the pinion shaft, and the housing.

5. The steering apparatus according to claim 4, wherein the variable transmission ratio mechanism further includes:

a lock device for locking the housing and the motor shaft to prohibit relative rotation therebetween, with the lock device having a lock holder arranged on a lower end of the motor shaft and a lock arm driven by a solenoid.

6. The steering apparatus according to claim 4, wherein the harmonic gear reduction device is arranged between the motor and the input shaft in an axial direction.

7. The steering apparatus according to claim 4, wherein:

the motor shaft is hollow;

the second circular spline is arranged above the first circular spline;

the input shaft has a large-diameter portion and is connected to the first circular spline at the large-diameter portion; and the output shaft has a connecting portion, is connected to the second circular spline at the connecting portion, and is inserted through the motor shaft.

* * * * *